May 5, 1959  R. L. WORRELL  2,885,129
VALVE AND OUTLET SPOUT FOR GRAIN BIN
Filed March 22, 1957
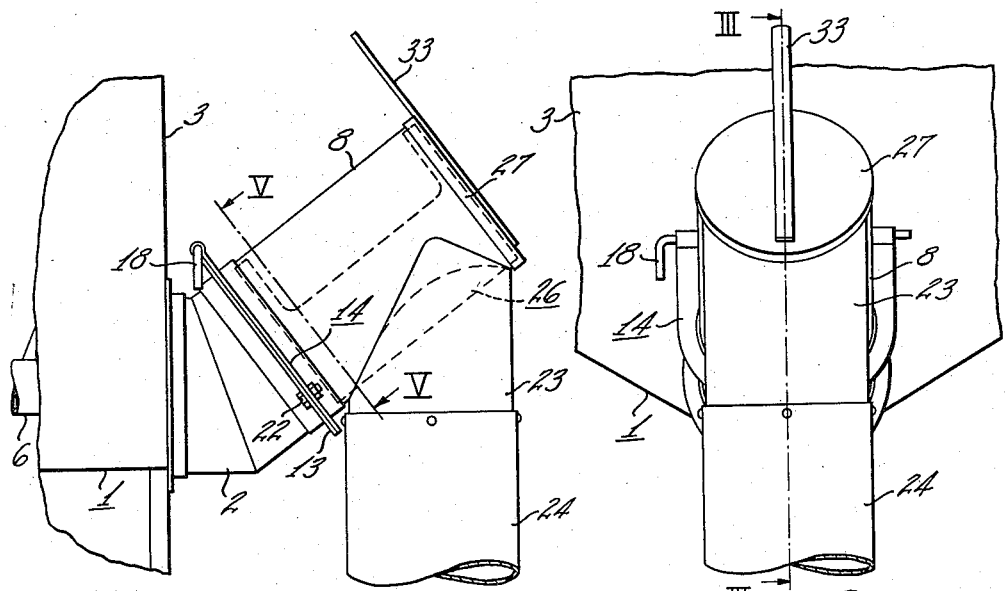
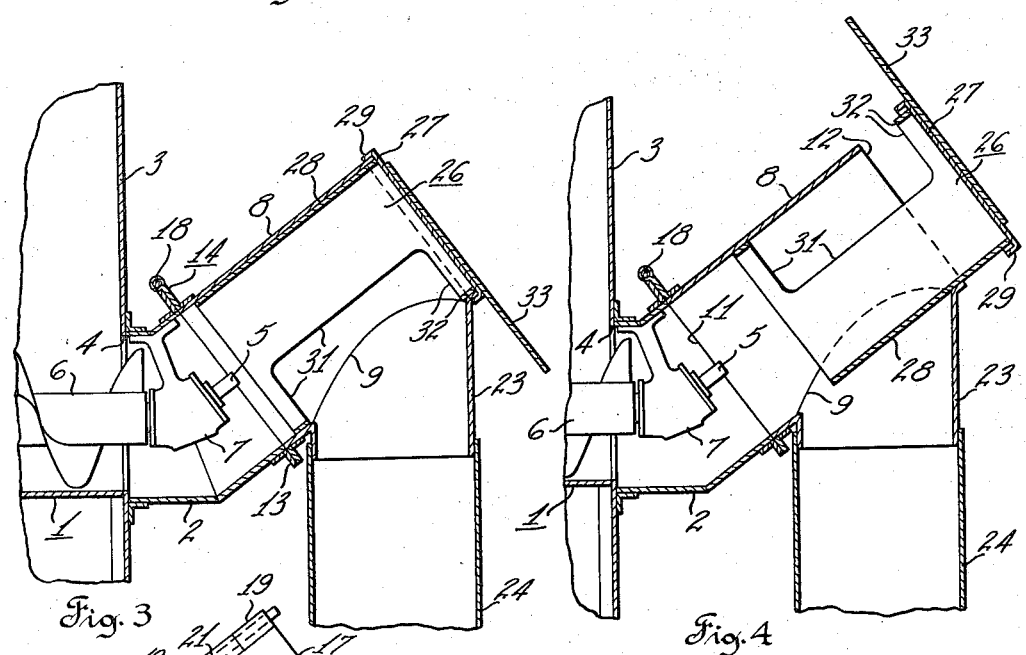
Inventor
Robert L. Worrell
by
Attorney United States Patent Office 2,885,129
Patented May 5, 1959

2,885,129

VALVE AND OUTLET SPOUT FOR GRAIN BIN

Robert L. Worrell, La Porte, Ind., assignor to Allis-Chalmers Manufacturing Company, Milwaukee, Wis.

Application March 22, 1957, Serial No. 647,882

4 Claims. (Cl. 222—519)

The invention relates to valves, and it is concerned more particularly with a type of valve which lends itself for use in systems for handling grain and similar material.

The principal object of the invention is to provide a simple, inexpensive valve which may be readily adjusted manually to open and closed positions and which will automatically adjust itself to a material discharging condition in the event that material is accidentally fed to it under pressure before the valve is manually adjusted to its open position.

Another object of the invention is to provide a valve of the above outlined character which has an outlet spout from which material may pass directly into a bag or sack connected to the spout.

A still further object of the invention is to provide a valve assembly of the above outlined character which may readily be installed on the grain bin of a combine harvester in lieu of the conventional auger type unloading conveyer.

These and other objects and advantages are attained by the present invention, various novel features of which will be apparent from the description herein and the accompanying drawings disclosing an embodiment of the invention, and will be more particularly pointed out in the appended claims.

In the drawings:

Fig. 1 is an elevational side view of part of the grain handling equipment of a harvester thresher including a valve embodying the invention;

Fig. 2 is an elevational end view of the structure shown in Fig. 1;

Fig. 3 is a sectional view on line III—III of Fig. 2, the valve in Fig. 3 being shown in a position of adjustment different from that in which it is shown in Fig. 2;

Fig. 4 is a sectional view similar to Fig. 3 but showing the valve in still another position of adjustment; and Fig. 5 is a section of the valve on line V—V of Fig. 1.

Harvester threshers are usually equipped with a bin in which the harvested material is accumulated while the machine is being operated in the field. It is also common practice to install an auger type cross conveyer in the bottom of the bin which may be started when it is desired to unload the bin and which feeds the harvested material steadily and positively into a conveniently located outlet passage at one side of the bin. In addition to the cross conveyer, an auger type elevating conveyer is usually provided when it is desired to unload the bin into a wagon which has been pulled up alongside the harvester thresher in the field. The elevating conveyer is required because the level at which the cross conveyer is arranged is usually too low to permit direct discharge of the harvested material from the cross conveyer into an ordinary farm wagon. A harvester thresher which is equipped with a cross conveyer and with an elevating conveyer in the mentioned manner is shown, for instance, in U.S. Patent 2,783,907, granted on March 5, 1957, to J. E. Hudgins for Adjustable Grain Bin Unloading Auger Assembly for Threshing Machines.

Referring to Figs. 1 and 2 of the accompanying drawings, a lower part of a grain bin for a harvester thresher (not shown) is generally indicated by the reference character 1, and a pipe elbow 2 is secured to a side wall 3 of the bin in registering relation to an outlet opening 4 (Fig. 3) of the grain bin. Operatively mounted in the bottom part of the grain bin 1 is an auger type cross conveyer of conventional construction, generally designated by the reference character 6, and the delivery end of the conveyer extends through the outlet opening 4 of the grain bin as shown in Figs. 3 and 4. A hollow support 7 enclosing a set of bevel gears, not shown, is mounted in the pipe elbow 2 for rotatably supporting the adjacent end of the cross conveyer 6. The gear housing 7 also mounts a power outlet shaft 5, for driving an unloading conveyer, if desired, and as shown in the mentioned Hudgins patent.

The valve of the present invention is mounted on the elbow 2 and comprises a cylindrically tubular housing element 8 having a side aperture 9 between axially spaced, circumferentially continuous wall portions thereof and presenting axially opposite end openings 11 and 12 (Fig. 4) defined by said wall portions, respectively. The elbow 2 and the housing element 8 are rigidly but detachably connected together and for that purpose they are provided with flange plates 13 and 14, respectively. The flange plate 13 is rigidly secured to the outer end of the elbow 2, and the flange plate 14 is similarly secured to the adjacent end of the tubular housing element 8. As shown in Fig. 5, the flange plate 14 has a semiannular part 16 which extends around the housing element 8 at the downwardly facing side of the latter, and a wing part 17 which extends from the upwardly facing side of the housing element 8. The flange plate 13 on the elbow 2 is of generally the same shape as the flange plate 14, and both plates are pivotally connected together by means of a hinge pin 18 which is slidably movable into and out of three hinge eyes 19 on the wing portion of the flange plate 13, and two complementary hinge eyes 21 on the wing portion 17 of the flange plate 14. A pair of bolts 22 (Fig. 5) are passed through registering holes in the semiannular flange parts of the flange plates 13 and 14 and are normally drawn up to secure the flange plates 13 and 14 rigidly together.

A tubular spout member 23 is secured as by welding to the lower side of the tubular housing element 8 and extends angularly outward therefrom in communicating relation to the side aperture 9. An extension pipe 24 which is rigidly secured in depending relation to the spout member 23 may be of any desired length so that a bag or sack, not shown, which is attached to the lower end of the pipe 24 may stand on the ground while it is filled with harvested material from the bin 1.

In order to selectively close and open the side aperture 9 and also the upper end opening 12 of the tubular housing element 8, the valve is equipped with a rotatable and axially slidable valve body which comprises two principal parts, namely, a sleeve element 26 and a circular disk 27. The disk 27 is secured to and closes one end of the sleeve element 26, so that the latter is axially closed and open, respectively, at its opposite ends. The sleeve element 26 has a radial load transmitting bearing surface 28 in rotatable and axially slidable engagement with a complementary bearing surface within the tubular housing element 8. The disk 27 projects radially beyond the sleeve element 26 in axially abuttable relationship to the annular edge at the open end 12 of the housing element 8, as illustrated by Figs. 3 and 4. The valve body also includes an annular lip 29 which extends from the periphery of the annular disk 27 in the same axial direction as the sleeve member 26. The lip 29 is radially spaced from the sleeve element 26 and has an inside diameter slightly larger than the outside diameter of the tubular housing element 8 so that in the condition of the parts as shown in Figs. 1 and 3, the upper end of the tubular housing element 8 is telescopically received in the annular space between the lip 29 and the sleeve element 26. The disk 27 and the upper circular edge of the tubular housing element 8 afford stop means which limit axial inward movement of the sleeve element 26 relative to the housing element 8 and thereby determine an operative condition of said sleeve element in which the latter uncovers the end opening 11 of the housing element 8, and in which condition the closed end of the sleeve element 26 closes the open end 12 of the housing element 8, as shown in Fig. 3.

The sleeve element 26 has a side opening 31 which is movable into and out of registry with the side aperture 9 of the housing element 8 by rotary adjustment of the sleeve element 26 relative to the housing element 8. When the valve element 26 is in the operative condition which is determined by axial abutment of the disk 27 with the upper edge of the housing element 8, the valve element may be rotated from the closed position in which it is shown in Fig. 1 and in which the side opening 31 (Fig. 4) of the sleeve element 26 is out of registry with the side aperture 9 of the housing element 8 into an open position as indicated by Fig. 3 in which the side opening 31 of the sleeve element 26 registers with side aperture 9 of the housing element 8.

The side opening 31 of the sleeve element 26 has a peripheral edge portion 32 next to the closed end of the sleeve element, and by axial outward adjustment of the sleeve element 26 from the position in which it is shown in Fig. 1, the peripheral edge 32 of the sleeve element 26 may be moved beyond the open end 12 of the housing element 8 as illustrated by Fig. 4. The axial length of the sleeve element 26 is such that in the condition of the parts as shown in Fig. 1, the side aperture 9 of the housing element 8 is fully closed by the peripheral wall of the sleeve element 26, and so that the side aperture 9 of the housing element 8 will be opened by the axial outward movement of the sleeve element 26 which brings the peripheral edge 32 of the sleeve element beyond the open end 12 of the housing element 8.

At the outer side of the disk 27 a handle 33 is attached as by welding and extends radially from the valve body at the same side at which the side opening 31 is formed in the sleeve member 26. The handle 33 permits convenient back and forth rotation of the valve sleeve 26 so as to open and close the side aperture 9 of the housing element 8. Since the handle projects toward the side of the valve body which contains the side opening 31 of the sleeve element 26, the handle also serves as an indicator to show whether the valve is open or closed. That is, when the handle 33 points upward as shown in Fig. 1 the valve is closed, and when the handle points downward as shown in Fig. 3 the valve is open.

The operation of the valve, when it is used on the grain bin of a harvester thresher as has been described hereinabove, is as follows:

While the harvester thresher is operating in the field, the valve will normally be closed as shown in Fig. 1. When it is desired to unload the bin, the machine is stopped and a bag or a sack is attached to the lower end of the extension pipe 24 which may be equipped with a suitable bag holding device, not shown. Preparatory to the actual unloading operation, the valve body 26, 27 is turned into the open position of the valve in which it is shown in Fig. 3. Cross conveyer 6 is then started to feed the harvested material such as grain, from the bin 3 through the outlet opening 4 into the elbow 2 from which the material then passes through the side aperture 9, spout 23 and extension pipe 24. When the bag is full the cross conveyer 6 is stopped and the valve 26 is turned to its closed position in which it is shown in Fig. 1. In this manner a number of bags may be filled until the bin is empty.

If conveyer 6 should accidentally be started while the valve is in its closed position as shown in Fig. 1, material from the bin 3 will be crowded through the elbow 2 into the tubular housing element 8 of the valve, and the valve body comprising the sleeve 26 and disk 27 will be pushed axially of the sleeve 8 in an outward direction as indicated by Fig. 4. Such axial outward movement of the valve body will partly open the side aperture 9 of the housing element 8 and also partly uncover the open end 12 of the housing element 8 so that damage of the valve will be prevented. The operator will immediately notice the improper condition of the mechanism, particularly if harvested material begins to come out through the opening 12 of the housing element 8.

If it is desired to remove the valve from the elbow 2 and substitute an auger type elevating conveyer in its place as shown in the mentioned Hudgins patent, this may readily be accomplished by removal of the bolts 22 and withdrawal of the hinge pin 18.

It should be understood that it is not intended to limit the invention to the particular forms and details described hereinabove, and that the invention includes such other forms and modifications as are embraced by the scope of the appended claims.

What is claimed is:

1. A valve comprising, in combination, a tubular housing element having a side aperture between axially opposite open ends thereof, a sleeve element axially closed and open, respectively, at its opposite ends and having a radial load transmitting bearing surface in rotatable and axially slidable engagement with a complementary bearing surface of said housing element, and stop means operatively interposed between said housing and sleeve elements so as to limit axial inward movement of said sleeve element relative to said housing element and thereby determine an operative condition of said sleeve element in which the latter closes one and uncovers the other, of said axially opposite ends of said housing element; said sleeve element having a side opening movable into and out of registry with said side aperture of said housing element by rotary adjustment of said sleeve element, while in said operative condition, to open and closed positions, respectively, and said side opening having an edge portion next to said closed end of said sleeve element movable beyond said one open end of said housing element by axial outward adjustment of said sleeve element relative to said housing element.

2. A valve comprising, in combination, a tubular housing element having a side aperture between axially spaced, circumferentially continuous wall portions thereof and presenting axially opposite end openings defined by said wall portions, respectively; a tubular spout member secured to said housing element and extending angularly outward therefrom in communicating relation to said side aperture; a sleeve element axially closed and open, respectively, at its opposite ends and having an external, radial load transmitting bearing surface in rotatable and axially slidable engagement with a complementary internal bearing surface of said housing element; and stop means operatively interposed between said housing and sleeve elements so as to limit axial inward movement of said sleeve element relative to said housing element and thereby determine an operative condition of said sleeve element in which the latter closes one and uncovers the other, of said axially opposite end openings of said housing elements; said sleeve element having a side opening movable into and out of registry with said side aperture of said housing element by rotary adjustment of said sleeve element, while in said operative condition, to open and closed positions, respectively, and said side opening having an edge portion next to said closed end of said sleeve element movable beyond said one end opening of said housing element by axial outward adjustment of said element relative to said housing element.

3. A valve as set forth in claim 2, wherein said stop means are afforded by an annular edge portion at said other end of said housing element and by a disk member secured to and projecting radially beyond said sleeve member in axially abuttable relation to said edge portion.

4. A valve as set forth in claim 3, and further comprising an operating handle for said sleeve member connected with said closed end of the latter in radially outward extending relation thereto.

References Cited in the file of this patent

UNITED STATES PATENTS

| 808,089 | Hopkins et al. | Dec. 26, 1905 |
| 1,301,229 | Coker | Apr. 22, 1919 |
| 1,365,781 | Hartnett | Jan. 18, 1921 |

UNITED STATES PATENT OFFICE

CERTIFICATE OF CORRECTION

Patent No. 2,885,129                                                         May 5, 1959

Robert L. Worrell

It is hereby certified that error appears in the printed specification of the above numbered patent requiring correction and that the said Letters Patent should read as corrected below.

Column 5, line 2, after "said", second occurrence, insert -- sleeve --.

Signed and sealed this 6th day of October 1959.

(SEAL)
Attest:

KARL H. AXLINE                                                       ROBERT C. WATSON
Attesting Officer                                               Commissioner of Patents